(12) United States Patent
Nagatsuka et al.

(10) Patent No.: US 6,742,273 B2
(45) Date of Patent: Jun. 1, 2004

(54) WORKPIECE MEASURING APPARATUS

(75) Inventors: Shinji Nagatsuka, Farmington Hills, MI (US); Mamoru Kamiya, Farmington Hills, MI (US); Yoichi Kawasaki, Nishikamo-gun (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 10/232,946

(22) Filed: Aug. 30, 2002

(65) Prior Publication Data

US 2004/0040168 A1 Mar. 4, 2004

(51) Int. Cl.$^7$ ................................................. G01B 5/00
(52) U.S. Cl. ............................................. 33/549; 33/552
(58) Field of Search .......................... 33/549, 550, 551, 33/552, 553, 554, 555, 502, 503

(56) References Cited

U.S. PATENT DOCUMENTS

| | | | |
|---|---|---|---|
| 3,463,479 A | * 8/1969 | Hennessey | 33/549 |
| 4,807,152 A | * 2/1989 | Lane et al. | 33/503 |
| 4,953,306 A | * 9/1990 | Weckenmann et al. | 33/503 |
| 5,396,712 A | * 3/1995 | Herzog | 33/503 |
| 5,446,971 A | * 9/1995 | Neumann | 33/503 |

FOREIGN PATENT DOCUMENTS

JP      5-346931      12/1993

OTHER PUBLICATIONS

Patent Abstract of Japan, Publication No. 05346931 A, Published Dec. 27, 1993, in the name of Matsushita Electric Ind Co Ltd.

* cited by examiner

Primary Examiner—Christopher W. Fulton
(74) Attorney, Agent, or Firm—Christie, Parker & Hale, LLP

(57) ABSTRACT

A workpiece measuring apparatus for measuring at least one of a size and a shape of a workpiece, machined by a turning or a grinding process system, includes a machine base, a column mounted on the machine base and having a mounting mechanism on at least one of the sides thereof, a measuring gauge unit removably mounted at an arbitrary position on the mounting mechanism of the column, and a conveying unit for conveying the machined workpiece to the measurement position where measurement can be performed by the measuring gauge unit. Thus, in the workpiece measuring apparatus according to the present invention, a measuring gauge unit can be fixedly added or removed in response to the change in the shape of the workpiece or the number of the desired measurement points.

12 Claims, 12 Drawing Sheets

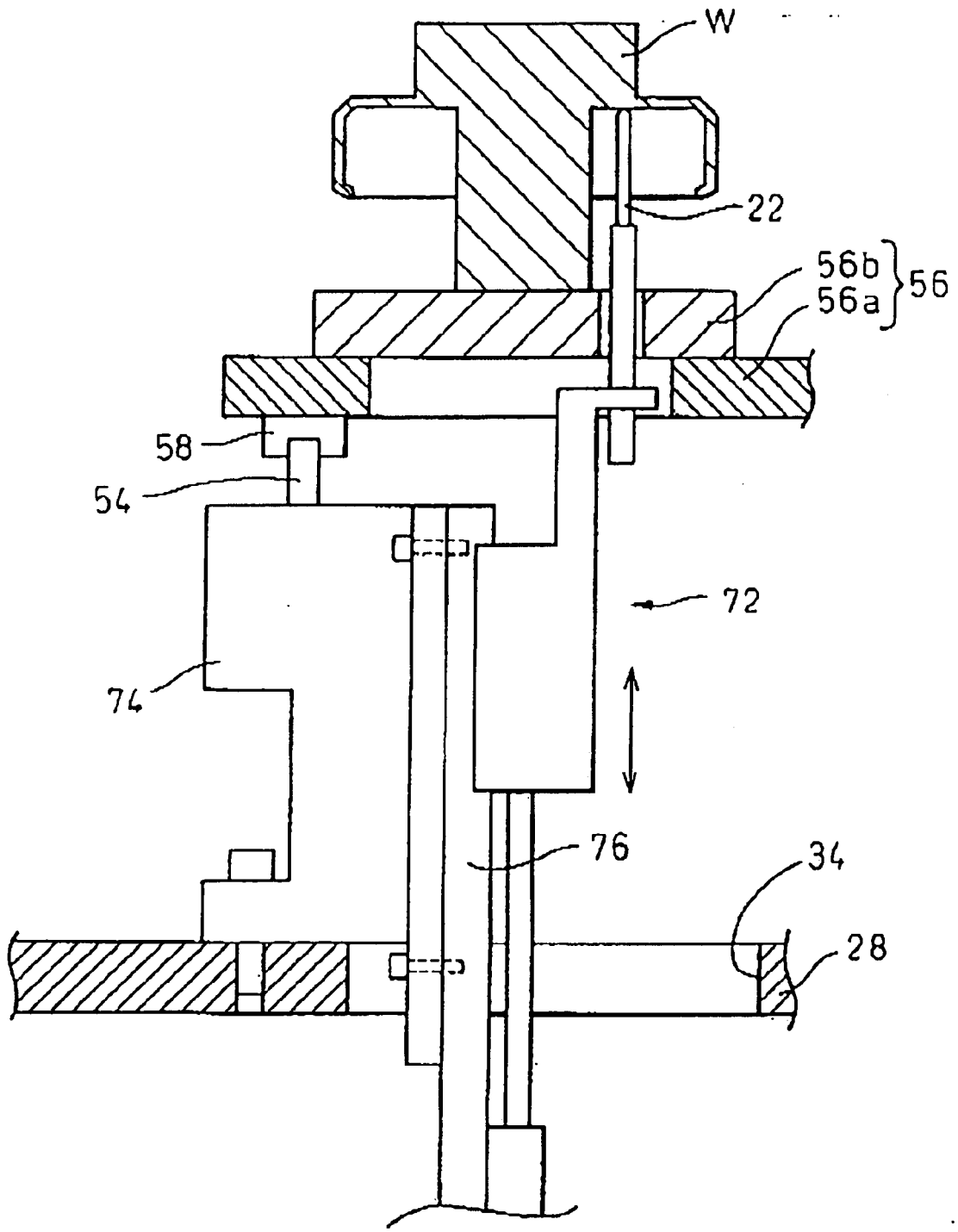

WORKPIECE MEASURING APPARATUS

BACKGROUND OF THE INVENTION

1. Field of the Invention

The present invention relates to a workpiece measuring apparatus for measuring at least one of a size and a shape of a workpiece.

2. Description of the Related Art

When a workpiece has been machined in a machine tool, the size or the shape of each portion of the machined workpiece is generally measured in the inspection process in order to check that the workpiece size obtained is suitable or to obtain feedback on the result of the machining. Especially in a turning or grinding process system, such as a grinding machine or a machining center, the size of the workpiece obtained by the machining process may change irregularly due to chipping of a tool, etc. and, therefore, the in-line or on-line inspection of a machined workpiece is often carried out.

In view of the recent remarkable progress of the machining speed of the machine tools, the throughput of a production line as a whole is dependent greatly on the throughput of the inspection process in the case where the in-line or on-line inspection is carried out as described above. Consequently, the workpiece measuring apparatus is required to measure the size or the shape of a workpiece rapidly.

On the other hand, a high dimensional accuracy has recently been required for a plurality of points of a machined part and, to meet this requirement, the workpiece measuring apparatus is required to have a high measurement accuracy for a plurality of points.

In order to meet these requirements, the conventional workpiece measuring apparatus is adapted to include a plurality of measuring gauges at fixed positions so that it can realize a high measurement accuracy and a high throughput by specializing each of the measuring gauges for the measurement of a specific portion of a workpiece having a specified shape and thereby limiting the measurable dimensional range to improve the measurement accuracy while, at the same time, making it possible to simultaneously measure different portions of a workpiece with a plurality of measuring gauges.

With the conventional workpiece measuring apparatus, however, the fact that the measuring gauges are fixedly arranged makes it difficult to change or add measurement positions in keeping with a change in the shape to which the workpiece is to be machined. Further, in view of the fact that the measurable dimensional range of each measuring gauge is limited, it is difficult even to follow the change in the size of the machined workpiece in versatile way. As a result, when the production line is changed, due to a change in the product design, a workpiece measuring apparatus is often required to be newly designed and developed.

Further, in the case where a recessed groove is formed in the outer peripheral surface of the workpiece together with the workpiece shape change, the conventional workpiece measuring apparatus poses the problem that the gauge head (i.e. the detector) of the measuring gauge is often trapped in the groove, thereby making it impossible to measure the outer peripheral size of the portion of the workpiece free of the groove. This is also the case with a workpiece having a hole of which the inner peripheral surface is formed with a recessed groove.

Also, the tool can be chipped off during the machining process, especially in the turning process, resulting in an excessively large machined workpiece. In the measuring gauge of a type in which the workpiece is measured by being arranged between two gauge heads, such an excessively large workpiece conveyed to the measurement position of the workpiece measuring apparatus would cause a problem of an interference with the two gauge heads and their resultant breakage.

SUMMARY OF THE INVENTION

Therefore, an object of the invention is to provide a workpiece measuring apparatus which can flexibly respond to a change in the production line due to a change in the product design.

Another object of the invention is to provide a workpiece measuring apparatus capable of measuring the size of that portion of the outer peripheral surface of a workpiece or that portion of the inner peripheral surface of a hole of a workpiece which is not formed with a recessed groove, even in the case where the workpiece or the hole thereof, as the case may be, is formed with such a recessed groove.

Still another object of the invention is to provide a workpiece measuring apparatus which can prevent gauge heads of a measuring gauge unit being broken even in the case where a workpiece larger than the measurable dimensional range of the measuring gauge unit is conveyed to a measurement position of the workpiece measuring apparatus.

According to the present invention, there is provided a workpiece measuring apparatus, for measuring at least one of a size and a shape of a workpiece, which includes:

a machine base;

a column mounted on the machine base and having a mounting mechanism on at least one of the side surfaces of the column;

a measuring gauge unit removably fixed at an arbitrary position on the mounting mechanism of the column; and a conveying unit for conveying a machined workpiece to a measurement position where a measurement can be performed by the measuring gauge unit.

A plurality of measuring gauge units may be removably mounted independently of each other at arbitrary positions on the mounting mechanism.

Preferably, the mounting mechanism includes one or more guide grooves, and the measuring gauge unit includes one or more sliding elements, the sliding element adapted to slidably engage in the guide groove.

Preferably, the machine base includes a support portion and a base plate removably mounted on the top of the support portion, and a plurality of different mounting sites for mounting the column thereon are formed on the base plate, the column being removably fixed on the base plate.

In similar way, preferably, the measuring apparatus further includes an operation panel for an operator to control the operation of the measuring gauge unit and the conveying unit; the machine base includes a support portion and a base plate removably mounted on the top of the support portion; and a plurality of different mounting sites for mounting the operation panel thereon are formed on the base plate, the operation panel being removably fixed at one of the mounting sites on the base plate.

Preferably, the base plate is formed with an opening, and when an additional measuring gauge unit is disposed in the machine base, the additional measuring gauge unit can measure at least one of the shape and the size of the workpiece positioned above the base plate through the opening.

The workpiece measuring apparatus further includes an additional column formed with a mounting mechanism, the additional column being mounted on the column.

According to a preferred embodiment, when it is determined that at least one of a size of an outer peripheral surface of the workpiece and a size of an inner peripheral surface of a hole of the workpiece is out of a predetermined range, the workpiece is rotated and the measuring gauge unit thereafter measures at least one of the size of the peripheral surface of the workpiece and the size of the inner peripheral surface of the hole of the workpiece again.

In this case, for example, the conveying unit includes a guide unit mounted on the base plate and a workpiece mount rotatable about a rotational axis extending vertically and movable along the guide unit, and when a measured size of at least one of an outer peripheral surface of the workpiece and an inner peripheral surface of a hole is out of a predetermined range, the workpiece mount is rotated and the size of at least one of the outer peripheral surface of the workpiece and the inner peripheral surface of the hole of the workpiece is thereafter measured again.

According to another preferred embodiment, the measuring gauge unit includes an interference prevention plate, the interference prevention plate having a cutoff adapted to receive a workpiece smaller than a predetermined tolerable size when the workpiece moves to the measurement position, and when the workpiece larger than the tolerable size moves to the measurement position, the workpiece interferes with ends of an inlet of the cutoff thereby to stop the movement of the workpiece or to move the workpiece away from the measurement position.

In this case, the cutoff of the interference prevention plate is preferably at a position between gauge heads in open state in preparation for the measurement.

According to still another preferred embodiment, the measuring gauge unit includes a movable portion for holding gauge heads, a driving portion for supporting the movable portion through an elastic element and driving the movable portion and, a sensor for detecting the displacement of the movable portion with respect to the driving portion and, when the sensor detects the displacement of the movable portion with respect to the driving portion, the movement of the movable portion of the measuring gauge unit with respect to the workpiece is stopped or the workpiece and the measuring gauge unit are moved away from each other.

In the workpiece measuring apparatus according to the present invention, the measuring gauge unit can be removably mounted on the column at an arbitrary position of the mounting mechanism of the column. Therefore, even in the case where the machining shape of the workpiece is changed, the measurement position can be easily changed accordingly.

Further, since a plurality of measuring gauges can be mounted independently of each other at arbitrary positions of the mounting mechanism, the workpiece measuring apparatus can easily respond to the change in the number of the portions required for the size measurement.

If the mounting mechanism forms a guide groove and the sliding element of the measuring gauge unit slidably engages in the guide groove, the mounting position can be adjusted by sliding the measuring gauge unit along the guide groove.

If a plurality of different mounting sites are formed on the base plate mounted on the top of the machine base, the mounting position or the orientation of the machine base and hence the measurement position can be easily changed in response to the change of the production line. In similar way, the position of the operation panel can be easily changed.

If the base plate is formed with an opening, the shape or the size of the workpiece positioned above the base plate can be measured through the opening. Thus, if the change of the workpiece design arises the requirement for measuring the size of the lower part of the workpiece, it can be met.

Further, for example, in the case where a recessed groove is formed in an outer peripheral surface of a workpiece or an inner peripheral surface of a hole in a workpiece, the size of the workpiece in the recessed groove or the size of the hole of the workpiece can be, for example, measured by the measuring gauge unit. When it is determined that the measured size is out of a predetermined range, the size of that portion of the workpiece or the hole which is not formed with the recessed groove can be measured by rotating the workpiece.

If the measuring gauge unit is provided with an interference prevention plate, a workpiece larger than the tolerable size cannot reach the measurement position, and, therefore, the gauge heads of the measuring gauge unit are prevented from interfering with the workpiece and being broken.

In the case where the movable portion holding the gauge heads is supported on the driving portion through an elastic element, if the gauge head or the movable portion interferes with the workpiece and is subjected to a force more than a tolerable range by the workpiece, the elastic element contracts and the movable portion is displaced with respect to the driving portion. Therefore, by detecting this displacement of the movable portion with respect to the driving portion, it can be detected that the gauge head or the movable portion is subjected to an improper force by the workpiece. Thus, the workpiece can be separated from the movable portion and the gauge heads, before the movable portion or the gauge head are otherwise broken. This makes it possible to prevent the gauge head or the movable portion from interfering with the workpiece and being broken.

BRIEF DESCRIPTION OF THE DRAWINGS

The above and other objects, features and advantages will be described in more detail on the basis of the embodiments of the present invention with reference to the accompanying drawings. In the drawings, similar reference numerals denote similar component parts, throughout the different embodiments:

FIG. 5 is an enlarged view of an essential part of a workpiece measuring apparatus according to an embodiment of the present invention, in which a measuring gauge unit is added below the measurement position of the workpiece measuring apparatus shown in FIGS. 1 and 2;

DESCRIPTION OF THE PREFERRED EMBODIMENTS

Figure 1:
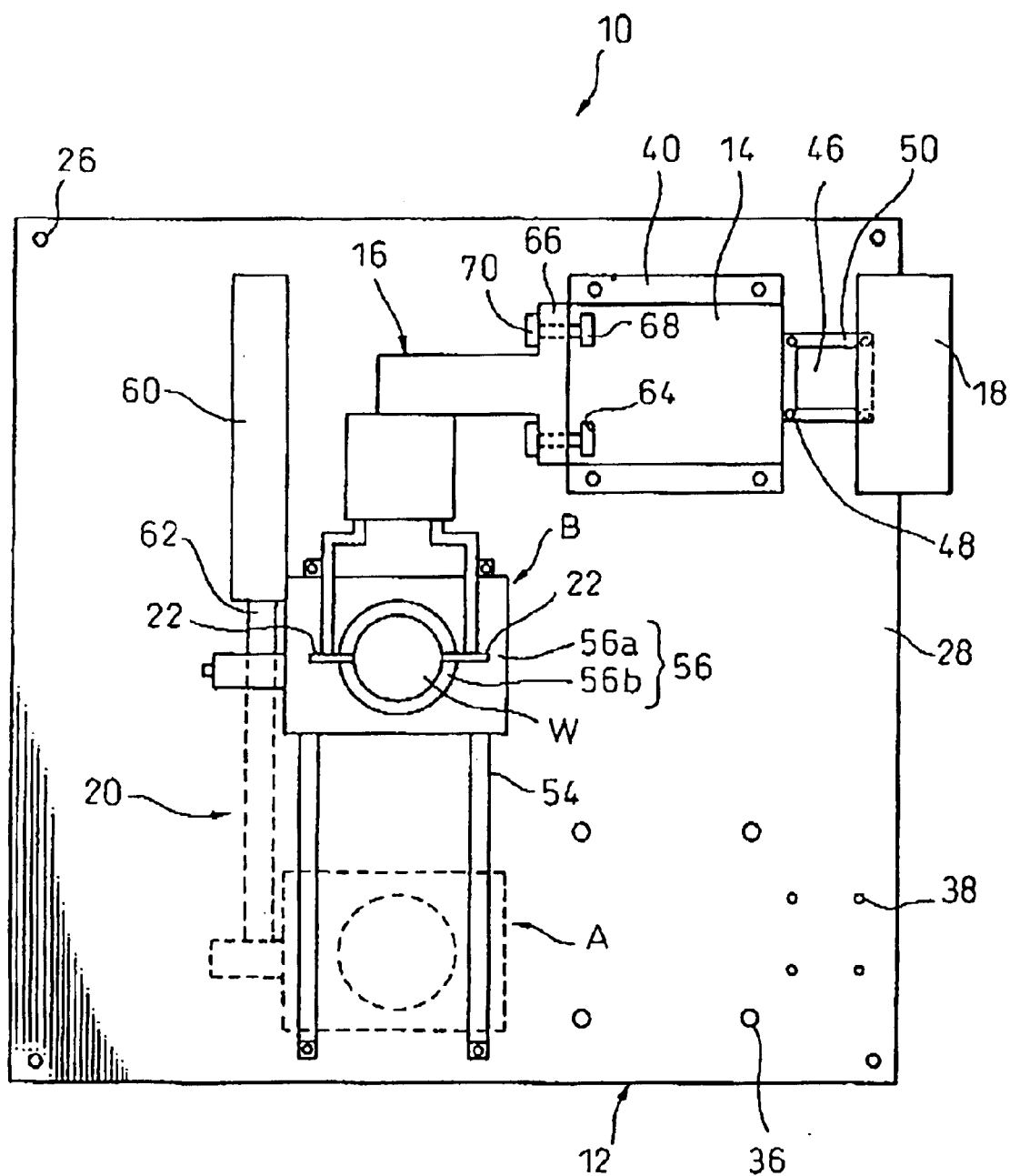
FIG. 1 is a plan view showing a general configuration of a workpiece measuring apparatus according to a preferred embodiment of the present invention.

First, the general configuration of a workpiece measuring apparatus according to a preferred embodiment of the present invention will be described with reference to FIGS. 1 and 2.

A workpiece measuring apparatus 10 for measuring a size or a shape of a workpiece includes a machine base 12 installed on the floor surface of a production room or the like, a column 14 mounted on the top surface of the machine base 12, a measuring gauge unit 16 mounted on the column 14 for measuring the machined workpiece W arranged at a measurement position, an operation panel 18 for operating the measuring gauge unit 16, and a conveying unit 20 for conveying the machined workpiece W from the preceding process to the measurement position of the workpiece measuring apparatus 10.

The measuring gauge unit 16 includes various types: for example, one type is provided at the forward end thereof with a pair of gauge heads 22 opposed in spaced relationship to each other, and can measure an outer size of a workpiece W by holding the workpiece W between the two gauge heads (i.e., detectors) 22 (see FIG. 1); another type is provided with two gauge heads 22 projecting from a peripheral surface of a cylindrical gauge body in opposite directions along the diameter thereof and can measure an inner diameter of a hole in a workpiece W by contacting the forward ends of the gauge heads 22 with the inner peripheral surface of the hole in the workpiece w (see FIG. 6); and a further type is provided with a single gauge head 22 projecting from one end of a cylindrical gauge body and can mainly measure the height, etc of a workpiece W by contacting the gauge head 22 with the surface of the workpiece W (see FIG. 5). These types of the measuring gauge unit, which are known and not directly related to the principle of the present invention, will not be described in greater detail.

The machine base 12 is divided into a support portion 24 and a base plate 28 removably mounted on the top of the support portion 24 with fasteners such as bolts 26. The base plate 28 may be removably mounted on the top of the support portion 24 by alternative means such as dovetail grooves, T-grooves or pressure fitting.

The support portion 24 is of the shape of a box or frame so as to accommodate a control unit 30 or a power unit (not shown) therein. A plurality of legs 32 adjustable along the vertical direction, i.e. along the height of the machine base 12, are disposed at the bottom portion of the support portion 24.

Figure 3A:
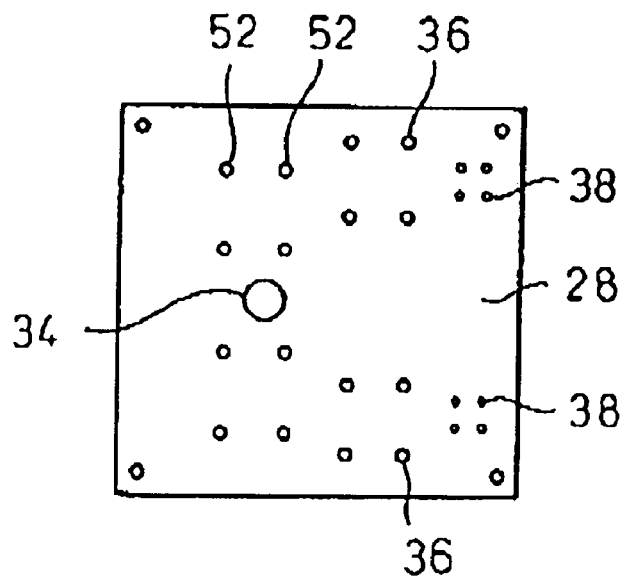
FIGS. 3A and 3B are plan views of the base plate of the machine base of the workpiece measuring apparatus shown in FIG. 1, FIG. 3B showing the reverse side of the base plate of FIG. 3A.
Figure 3B:
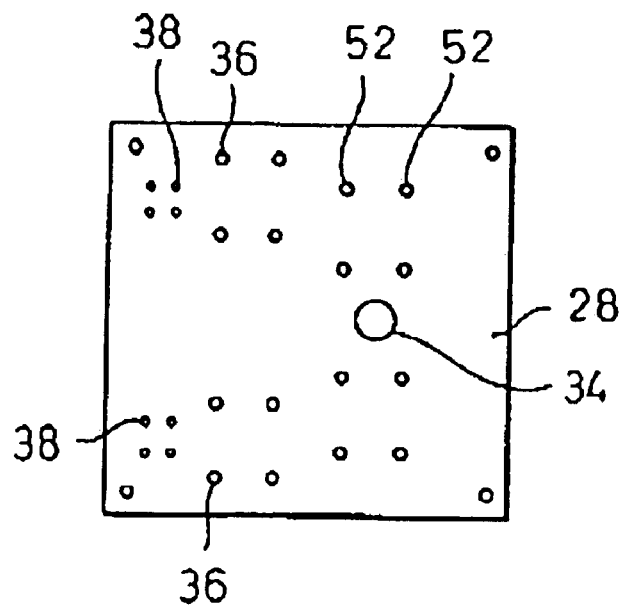
Figure 4:
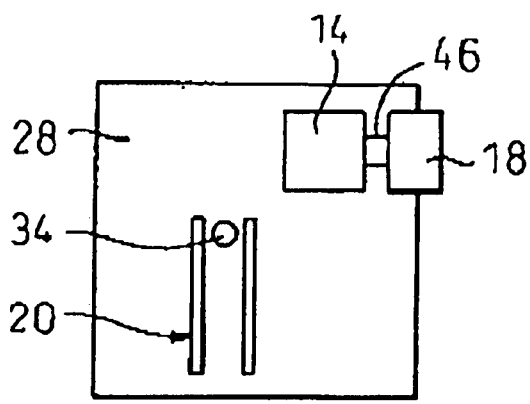
FIGS. 4A to 4H are diagrams showing a layout of a column, an operation panel and guide rails which can be employed on the base plate shown in FIG. 3A.
Figure 4:
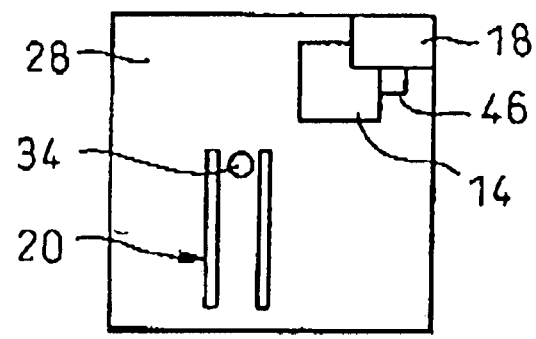
Figure 4:
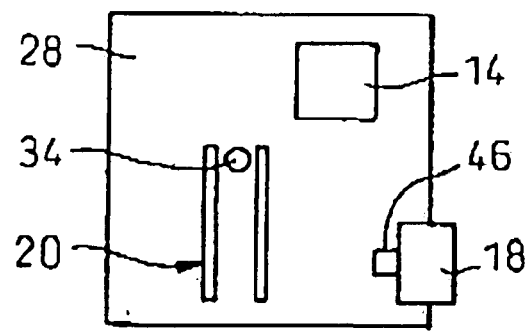
Figure 4:
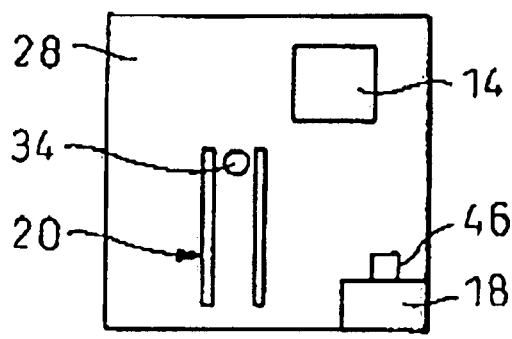
Figure 4E:
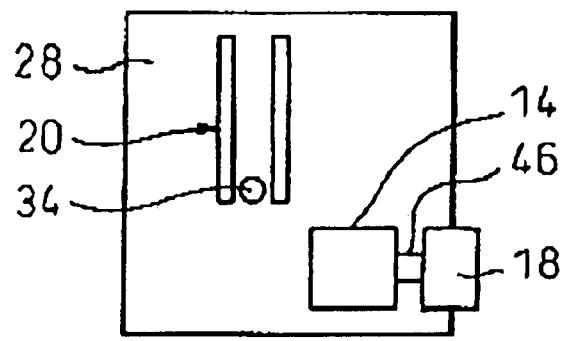
Figure 4F:
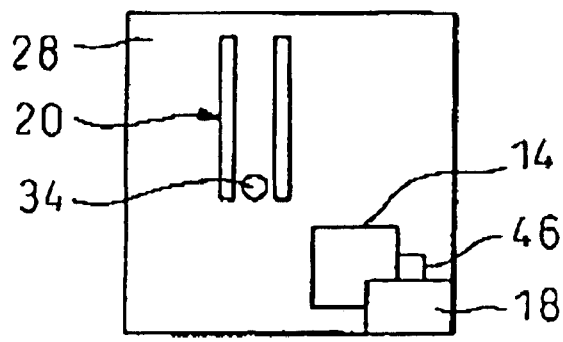
Figure 4G:
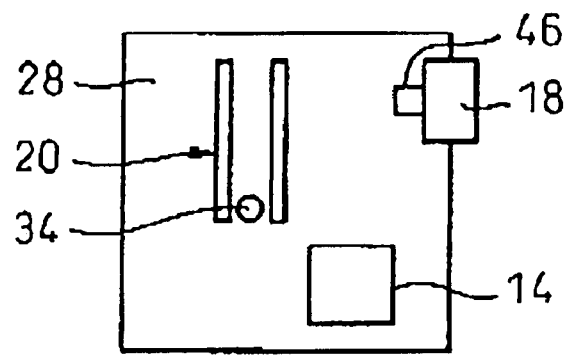
Figure 4H:
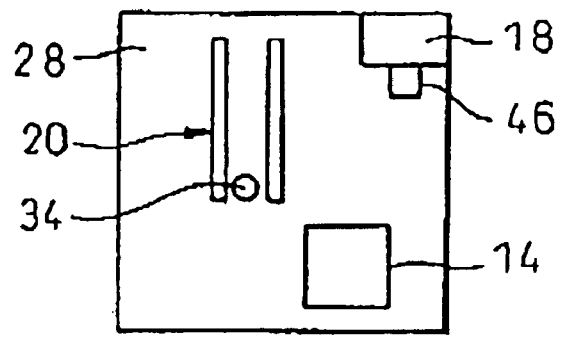

On the base plate 28, as shown in FIGS. 3A and 3B, there are formed a plurality of (two in FIGS. 3A and 3B) different column mount sites for mounting the column 14 on the base plate 28, a plurality of (two in FIGS. 3A and 3B) different operation panel mount sites for mounting the operation panel 18 on the base plate 28, a plurality of different guide unit mount sites for mounting the guide unit of the conveying unit 20 described later on the base plate 28, and a through opening 34 located below the measurement position.

Each of a plurality of the column mount sites includes a portion in which a plurality of, or preferably four, through holes 36 are formed. Similarly, each of a plurality of the operation panel mount sites includes a portion in which a plurality of, or preferably four, through holes 38 are formed. In the embodiment shown in FIGS. 1 and 2, the through holes 36, 38 of the column mount sites and the operation panel mount sites are all formed as threaded holes in order to permit the column 14 and the operation panel 18 to be mounted on the base plate 28 only by bolts and without using nuts or the like.

Figure 2:
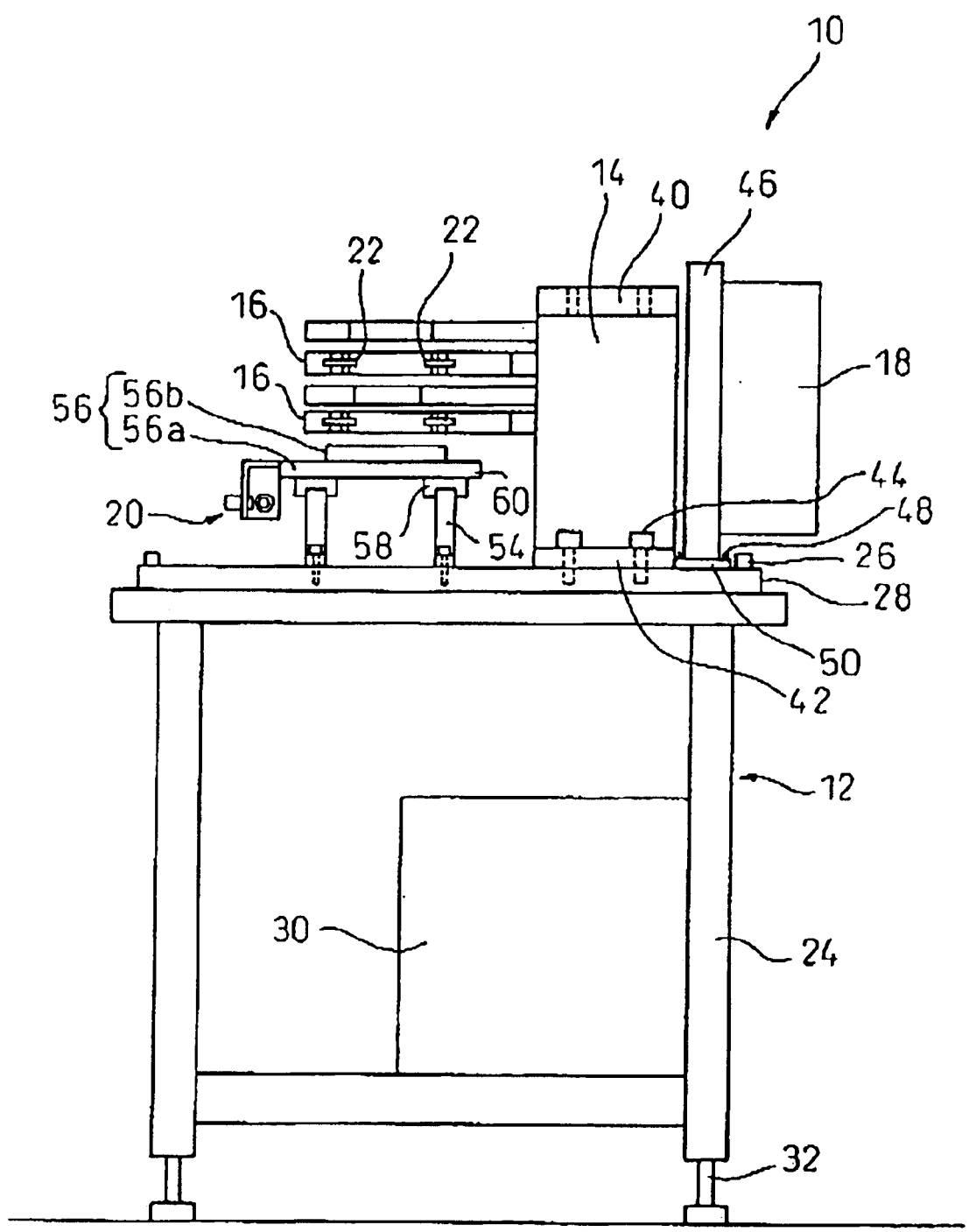
FIG. 2 is a side view of the workpiece measuring apparatus shown in FIG. 1.

In the embodiment shown in FIGS. 1 and 2, the upper and lower portions of the column 14 are formed with upper and lower flange portions 40, 42, respectively. The column 14 is fixedly secured on the base plate 28 by screwing the bolts 44 into the threaded holes 36 of the column mount site through the lower flange portion 42. However, the column 14 can be fixedly secured on the base plate 28 by another fastening method. For example, threaded holes are formed in the bottom surface of the column 14, and the bolts 44 are screwed into a plurality of threaded holes formed in the bottom surface of the column 14 through the through holes 36 of the column mount site from the underside of the base plate 28.

At the operation panel mount site, a pillar 46 for supporting the operation panel 18 is mounted on the base plate 28 by fasteners such as bolts 48, so that the operation panel 18 is mounted on the base plate 28 via the pillar 46. More specifically, a flange portion 50 is also disposed on the bottom of the pillar 46 and, by screwing the bolts 48 into the threaded holes 38 of the operation panel mount site through the flange portion 50, the pillar 46 is fixedly secured on the base plate 28. Also in this case, similarly to the mounting of the column 14 on the base plate 28, the operation panel 18 can be fixedly secured on the base plate 29 by another fastening method. For example, the bolts 44 are screwed into a plurality of the threaded holes formed in the bottom surface of the pillar 46 through the through holes 38 of the operation panel mount site from the underside of the base plate 28. The pillar 46 has a substantially square horizontal cross section, and, therefore, by mounting the pillar 46 on the base plate 28 in a different orientation, the orientation of the operation panel 18 can be changed.

The guide unit mount site includes a portion in which a pair of rows of through holes are formed on straight lines preferably parallel to each other, each row including four through holes 52. By displacing the positions of those of the four through holes 52 actually used, the mounting position of the guide unit can be displaced.

With the configuration described above, the column 14, the operation panel 18 and the conveying unit 20 can be arranged in any of eight layouts with respect to the base plate 28 shown in FIG. 3A, as shown in FIGS. 4A to 4H. Also, as the mounting holes 36, 38, 52 described above are all through holes, the column 14, the operation panel 18 and the conveying unit 20 can be arranged in another eight layouts by turning the base plate shown in FIG. 3A upside down and mounting the base plate 28 on the support portion 24 in the state shown in FIG. 3B. Therefore, in the workpiece measuring apparatus 10 according to the present invention, the position of the operation panel 18 and the measurement position can be flexibly changed in response to a change in the production line. Further, in view of the fact that the base plate 28 is substantially square in shape, the workpiece measuring apparatus 1 can be turned by, for example, 90 degrees to change the conveyance direction of the conveying unit 20 without changing the area occupied by the workpiece measuring apparatus 10. This further facilitates the layout change of the workpiece measuring apparatus 10.

In the case where the workpiece measuring apparatus 10, therefore the machine base 12, is turned by 90 degrees, the operability and the maintainability of the control unit 30, etc. installed in the inside of machine base 12 may be adversely affected. Desirably, therefore, an additional fixing threaded hole is formed in the machine base 12 so that the control unit 30, etc. can be fixedly secured at different 90-degree positions in the machine base 12.

Referring again to FIGS. 1 and 2, the conveying unit 20 includes a pair of guide rails 54 mounted on the base plate 28 as a part of the guide unit and a workpiece mount 56 movable along the guide rails 54 and rotatable about a rotational axis extending in vertical direction. More specifically, the workpiece mount 56 includes a carriage 56a having on the bottom surface thereof sliders 58 engaging with the guide rails 54 and adapted to move along the guide rails 54, and a turntable 56b disposed on the carriage 56a and being rotatable about the rotational axis extending in vertical direction. The workpiece mount 56 is adapted to convey the workpiece W from a transfer position A indicated by dotted line in FIG. 1 to the measurement position B indicated by solid line in FIG. 1 while rotating the workpiece placed on the turntable 56b about the rotational axis.

At the transfer position A, the workpiece W that has already been measured is transferred out to the next process or to the temporary storage position by a robot arm or a conveyor (not shown), while the workpiece W already machined and conveyed from the preceding process is placed on the turntable 56b of the workpiece mount 56. On the other hand, at the measurement position B, the sizes of portions of the machined workpiece W are measured by the measuring gauge unit 16.

Generated chips and a working fluid used during the machining process may remain unremoved on the machined workpiece W placed on the turntable 56b of the workpiece mount 56. The chips and the working fluid may impede the accurate measurement performed by the measuring gauge unit 16. When moving the workpiece mount 56 along the guide rails 54, therefore, the conveying unit 20 applies compressed air to the workpiece W to blow off the remaining chips and working fluid. Alternatively, a scraper (not shown) of rubber material or flexible plastic material may be brought into contact with the surface of the passing workpiece W thereby to remove the chips and working fluid, or both compressed air and the scraper may be used at the same time.

According to the embodiment shown in FIGS. 1 and 2, a linear guide including the guide rails 54 and the sliders 58 is used as a guide unit for the conveying unit 20. However, another type of guide unit can be used.

A forward end of an extendable rod 62 of a driving cylinder such as a hydraulic or air cylinder is connected to the side portion of the carriage 56a, so that the carriage 56a can be moved along the guide rails 54 by the extension or contraction of the rod 62 of the driving cylinder 60. Instead of this driving cylinder 60, a driving mechanism utilizing a motor and a feed screw may be used.

A pair of mounting grooves 64 extending longitudinally of the workpiece W (i.e. in vertical direction) are formed as a mounting mechanism on one side surface of the column 14. An arbitrary number of measuring gauge units 16 can thus be removably mounted independently at arbitrary positions along the mounting grooves 64. In FIG. 2, for example, two measuring gauge units 16 are mounted on the column 64 at different positions along the mounting grooves 64, thereby making it possible to measure the outer diameter of the workpiece W in two different measurement ranges. In the embodiment shown in FIGS. 1 and 2, each of the mounting grooves 64 is formed as a guide groove in the shape of T-slot, while a flange portion 66 is formed at one end of the measuring gauge unit 16 and includes sliding elements 68 adapted to engage in the guide grooves 64 and to slide within the guide grooves 64. The sliding elements 68 of measuring gauge units 16, therefore, are inserted into the guide grooves 64 from the upper end of the column 14 to engage in the T-slotted guide grooves 64 so that they can slide to the desired mounting position along the guide grooves 64. The sliding elements 68 are also connected to the measuring gauge unit 16 by bolts 70 extending through the flange portion 66 of the measuring gauge unit 16. Therefore, by turning the bolts 70, the inlet edge portion of each of the guide grooves 64 is tightened between the sliding elements 68 and the flange portion 66, thereby making it possible to fix the measuring gauge unit 16 at the desired position along the guide grooves 64.

In the embodiment shown in FIGS. 1 and 2, the T-slotted guide grooves 64 and the sliding elements 68 are used as a mounting mechanism. However, another type of mounting guide mechanism such as a dovetail groove guide or a round key groove guide can be used.

As described above, with the workpiece measuring apparatus 10 according to the present invention, an arbitrary number of measuring gauge units 16 can be mounted independently on the column 14, and each measuring gauge unit 16 can be moved to an arbitrary position along the mounting grooves 64 of the column 14 thereby to adjust the mounting position. The workpiece measuring apparatus 10 according to the present invention, therefore, facilitates, in response to the change of the shape of the workpiece W or the change of the portion required for the measurement, the job of replacing a given measuring gauge unit 16 mounted on the column 14 with another measuring gauge unit 16 having a proper measurement range or that of the proper type, adding a new measuring gauge unit 16 to mount it on the column 14, or adjusting a position measured by the measuring gauge unit 16. Thus, the production line can be changed quickly in response to the design change of the product shape, etc.

Referring to FIG. 5, a workpiece measuring apparatus 10 according to another embodiment of the present invention is shown in which an additional measuring gauge unit 72 is disposed below the measurement position of the workpiece measuring apparatus 10 shown in FIGS. 1 and 2. The base plate 28 is formed with the through opening 34 at a position below the measurement position B, as described above. As a result, this allows the sliding mechanism 76 to be mounted on the base plate 28 through a bracket 74 so as to pass through the opening 34. The sliding mechanism 76 allows the gauge heads 22 of the measuring gauge unit 72 to project through the carriage 56a and the turntable 56b from the underside of the workpiece mount 56 of the conveying unit 20, thereby measuring a hole, etc. formed in the lower side surface of the workpiece W located at the measurement position above the base plate 28. It is assumed that the carriage 56a and the turntable 56b are formed with through holes to permit the gauge heads 20 to project therethrough.

Thus, the provision of the through opening 34 in the base plate 28 makes it possible to meet the requirement for additional installation of the measuring gauge unit 72 below the workpiece mount 56.

Figure 6:
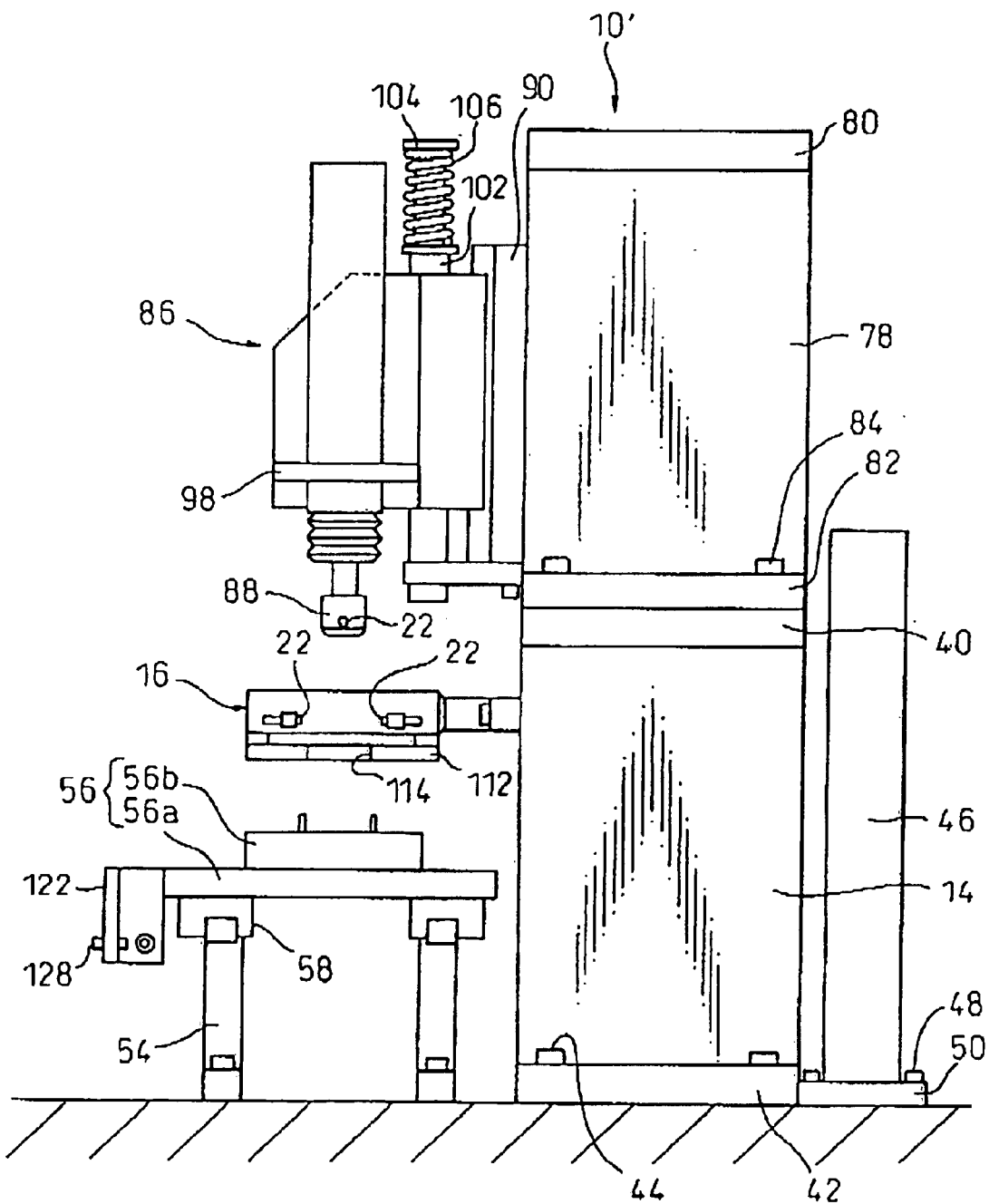
FIG. 6 is a side view of an essential part of a workpiece measuring apparatus according to another embodiment of the present invention, in which an additional column is mounted on the column of the workpiece measuring apparatus shown in FIGS. 1 and 2.

Referring to FIG. 6, a workpiece measuring apparatus 10' according to another embodiment of the present invention is shown, in which an additional column 78 is mounted above the column 14 (referred as the basic column for distinction in the description of the embodiment shown in FIG. 6) of the workpiece measuring apparatus 10 shown in FIGS. 1 and 2. The additional column 78, which has substantially the same shape as the basic column 14, includes an upper flange portion 80 and a lower flange portion 82 at the upper and lower parts thereof, respectively, and has a side thereof formed with a pair of mounting grooves (invisible) extending longitudinally to the workpiece. The upper flange portion 40 of the basic column 14 and the lower flange portion 82 of the additional column 78 are kept in contact with each other and fastened to each other by fasteners such as bolts 84. It should be noted that the mounting grooves 64 of the basic column 14 and the mounting grooves (invisible) of the additional column 78 are aligned in series with each other. Thus, the measuring gauge unit 16 mounted in the mounting grooves 64 of the basic column 14 and the mounting grooves of the additional column 78 can slide along the mounting grooves over these two columns.

According to the embodiment shown in FIG. 6, the measuring gauge unit can be mounted at a higher position for measuring a tall workpiece W. Also, as shown in FIG. 6, a measuring gauge unit 86 having a long sliding mechanism in the direction along the length of the workpiece W can be added to permit the gauge heads 22 to move longitudinally with respect to the workpiece W. The additional column 78, if not required any longer, can of course be removed from the basic column 14.

In the embodiment shown in FIG. 6, both the measuring gauge unit 16 for measuring the outer diameter of the workpiece W and the measuring gauge unit 86 for measuring the inner diameter of the hole formed in the workpiece W are used. The measuring gauge units 16, 86 of these types may be broken in the case where an attempt is made to measure a workpiece larger than the tolerable size which may be produced by a chipped tool or the like.

With the type of measuring gauge unit 16 used in the embodiments of FIGS. 1, 2 and 6 for measuring an outer diameter of a workpiece W, for example, in the case that the workpiece W having an outer diameter larger than the distance between two opposed gauge heads 22 most widely spaced from each other in preparation for the measurement is conveyed to the measurement position by the conveying unit, the workpiece W will interfere with the two gauge heads 22 and break them. On the other hand, with the type of measuring gauge unit 86 used in the embodiment of FIG. 6 for measuring an inner diameter of a hole formed in the workpiece W, in the case that a workpiece W formed with a hole smaller than an outer diameter of a cylindrical gauge body 88 is placed at the measurement position, an attempt to insert the cylindrical gauge body 88 into the hole of the workpiece W may cause the cylindrical gauge body 88 to interfere with the hole of the workpiece W and to break the gauge body 88 and even the gauge heads 22. Further, with that type of the measuring gauge heads 72 used in FIG. 5, an attempt to measure the workpiece W exceeding an assured dimensional range may break the gauge heads 22 as the result of excessive approach of the workpiece W to the gauge heads 22.

In view of this, in the embodiment shown in FIG. 6, the measuring gauge unit 16 for measuring the outer diameter of the workpiece W and the measuring gauge unit 86 for measuring the inner diameter of the workpiece W are each provided with a breakage prevention mechanism for preventing the breakage of the measuring gauge unit 16, 86. This breakage prevention mechanism will be described in detail below.

Figure 7:
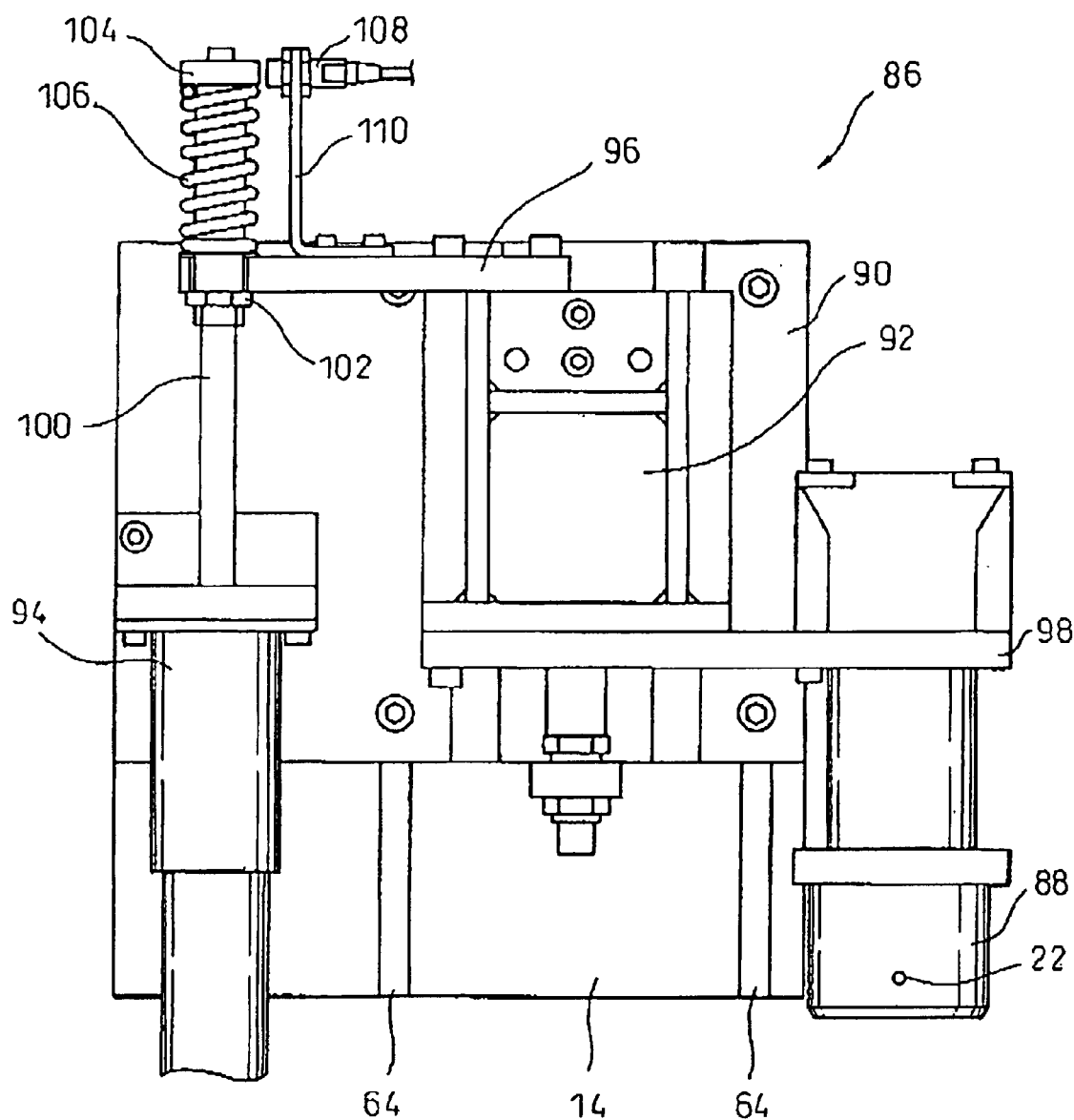
FIG. 7 is an enlarged view of an essential part of an embodiment of a breakage prevention mechanism used for a measuring gauge unit of inner diameter measurement type.

Referring to FIG. 7, an enlarged view of an essential part of a breakage prevention mechanism used for the measuring gauge unit 86 of inner diameter measurement type shown in FIG. 6 is shown. The measuring gauge unit 86 of inner diameter measurement type includes a mounting plate 90 and is fixed on the column 14 by fixing the mounting plate 90 removably in the mounting grooves 64 of the column 14. A sliding block 92 slidable along the surface of the mounting plate 90 by a linear guide and a driving cylinder 94 are mounted on the surface of the mounting plate 90.

A connection arm 96 extends toward the driving cylinder 94 from the upper end portion of the sliding block 92, while a support arm 98 extends from the lower end portion of the sliding block 92, thereby supporting the cylindrical gauge body 88 at one end of the support arm 98.

A rod 100 of the driving cylinder 94 has a fixing nut 102 fixed at an intermediate portion thereof and a dog 104 fixed at a forward end portion thereof. One end of the connection arm 96 is connected to the rod 100 to be movable between the fixing nut 102 and the dog 104. Further, a coil spring 106 constituting an elastic element is disposed around the rod 100 between the dog 104 and the one end of the connection arm 96, thereby usually urging the connection arm 96 against the fixing nut 102. A proximity sensor 108 is disposed in opposed relationship to the dog 104, and a bracket 110 for supporting the proximity sensor 108 is fixed to the connection arm 96.

As described above, a movable portion configured of the connection arm 96, the sliding block 92, the support arm 98 and the gauge body 88 held by the support arm 98 is driven in vertical direction by a driving portion configured of the driving cylinder 94.

The measuring gauge units of that type having a pair of the gauge heads are used as the measuring gauge unit 16 of outer diameter measurement type and the measuring gauge unit 86 of inner diameter measurement type. However, individual measuring gauge units each having a single gauge head may be used in a pair as the measuring gauge unit of outer or inner diameter measurement type. In this case, the workpiece measuring apparatus can respond to a considerable dimensional change of the workpiece.

The operation of the breakage prevention mechanism shown in FIG. 7 will be now explained.

When the rod 100 of the driving cylinder 94 extends in preparation for the measurement of the workpiece W, the fixing nut 102 fixed at the intermediate portion of the rod 100 pushes up the connection arm 96, thereby rising the sliding block 92 connected to the connection arm 96 and then moving up the gauge body 88 supported on the sliding block 92 through the support arm 98. When the workpiece W is conveyed to the measurement position by the conveying unit 20, the rod 100 of the driving cylinder 94 is contracted. The sliding block 92 then moves down through the connection arm 98 in contact with the fixing nut 102 at the intermediate portion of the rod 100, while at the same time moving down the gauge body 88 supported on the sliding block 92 through the support arm 98. In the case where the inner diameter of the hole formed in the workpiece W to be measured is smaller than the outer diameter of the gauge body 88, however, the gauge body 88 cannot proceed into the inside of the hole, so that the gauge body 88 comes into contact with the surface of the workpiece W around the hole and can no longer move downward. As a result, the sliding block 92 and the connection arm 96 connected to the support arm 98 also become unable to move down.

At this time, with the conventional measuring gauge unit, the rod 100 of the driving cylinder 94 continues to move down, and therefore a force is applied to the gauge body 88 and breaks it. In contrast, with the breakage prevention mechanism shown in FIG. 7, when the gauge body 88 comes into contact with the workpiece W, the connection arm 96 and the sliding block 92 come to stop and cannot move down any further so that the connection arm 96 compresses the coil spring 106 and slides along the rod 100, moving relatively toward the dog 104 fixed at the forward end portion of the rod 100. At this time, since the distance between the connection arm 96 and the dog 104 is shorter and the proximity sensor 108 is supported on the connection arm 96 through the bracket 110, the dog 104 moves away from the position in opposed relationship to the proximity sensor 108. As a result, the proximity sensor 108 can detect that the sliding block 92 and the gauge body 88 have moved relatively with respect to the rod 100 of the driving cylinder 94. In other words, the proximity sensor 108 can detect that the gauge body 88 has come into contact with the workpiece W.

When the proximity sensor 108 detects that the gauge body 88 has come into contact with the workpiece W, the control unit 30 stops the downward movement of the rod 100 of the driving cylinder 94 and moves up the rod 100 in order to remove the force acting on the gauge body 88.

A coil spring having such a spring modulus that it is not compressed under the force which the workpiece W can apply to the gauge body 88 during normal measurement is selected as the coil spring 106. During the normal measurement, therefore, the dog 104 cannot move away from the position in opposed relationship to the proximity sensor 108. In the embodiment shown in FIG. 7, the coil spring 106 is used as the elastic element, although other kind of elastic element such as rubber can be used in place of the coil spring 106.

Figure 8:
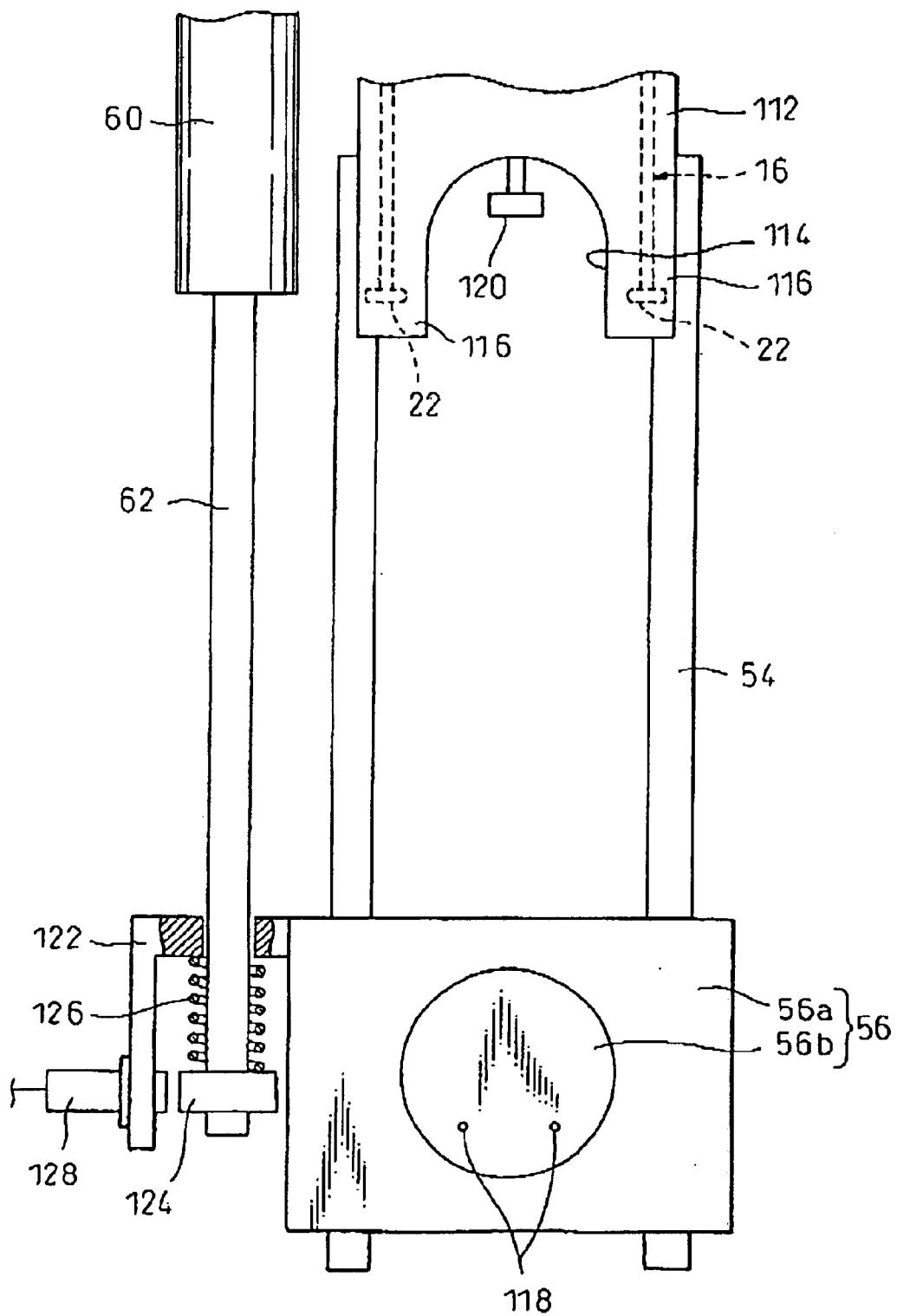
FIG. 8 is an enlarged view of an essential part of an embodiment of a breakage prevention mechanism used for a measuring gauge unit of outer diameter measurement type.

On the other hand, referring to FIG. 8, an enlarged view of an essential part of a breakage prevention mechanism used for the measuring gauge unit 16 of outer diameter measurement type shown in FIG. 6 is shown. The measuring gauge unit 16 of outer diameter measurement type includes an interference prevention plate 112 adjacent to the measuring portion thereof. The interference prevention plate 112 may be either formed integrally with the measuring gauge unit 16 or mounted as a separate component in the mounting grooves 64 of the column 14. The interference prevention plate 112 has a cutout 114 at a portion thereof corresponding to the measurement position for the measuring gauge unit 16. The function of the cutout 114 allows the interference prevention plate 112 to receive a workpiece W smaller than a predetermined tolerable size when such workpiece W moves to the measurement position. On the other hand, a workpiece W larger than the tolerable size cannot be received in the cutout 114 when such workpiece W moves toward the measurement position because the workpiece W interferes with arm portions 116 at the ends of the inlet opening of the cutout 114. Therefore, when the cutout 114 is formed in a size smaller than the area formed between the opposed gauge heads 22 arranged in the furthest open position in preparation for the measurement, the interference prevention plate 112 does not allow the workpiece W larger than the area formed between the gauge heads 22 to reach the measurement position, so that the workpiece W brought to the measurement position by the conveying unit 20 cannot interfere with the gauge heads 22 in an open position to prevent the breakage of the gauge heads 22.

The embodiment shown in FIG. 8 further includes an interference detection mechanism for detecting any interference of the workpiece W with the arm portions 116 of the interference prevention plate 112. This interference detection mechanism will be described in detail below.

Two push pins 118 are disposed, in a spaced relationship to each other, on the turntable 56b of the workpiece mount 56 of the conveying unit 20. The measuring gauge unit 16 is provided with a stopper plate 120 urged toward the push pins 118 by a spring. Thus, when the workpiece W placed on the turntable 56b reaches the measurement position, it is pressed against the two push pins by the stopper plate 120 to be brought into position.

An L-shaped bracket 122 is mounted on the side of the carriage 56a of the conveying unit 20, and the extendable rod 62 of the driving cylinder 60 extends through the bracket 122. The dog 124 is fixed at the forward end portion of the rod 62, and a coil spring 126 extending spirally around the rod 62 is interposed between the dog 124 and the bracket 122. On the other hand, a proximity sensor 128 is mounted at the forward end portion of the bracket 122 such that it is in a position opposed to the dog 124 when the carriage 56a is stationary or moves toward the measurement position.

With the conveying unit 20 having such a configuration, when the workpiece W is conveyed from the transfer position A to the measurement position B, the driving cylinder 60 is generally activated to contract the rod 62. At this time, the force toward the measurement position A is transmitted from the rod 62 through the coil spring 126 to the bracket 122 and the carriage 56a, so that the carriage 56a moves toward the measurement position B along the guide rails 54. On the other hand, when the workpiece W is conveyed from the measurement position B to the transfer position A, the rod 62 is extended. Thus, the force toward the transfer position A is transmitted from the rod 62 through the coil spring 126 to the bracket 122 and the carriage 56a, so that the carriage 56a moves toward the transfer position A along the guide rails 54. It should be noted that the coil spring 126 is selected to have such a spring modulus that the length thereof substantially remains unchanged during the above normal movement.

In the case where a workpiece W larger than the tolerable size is placed on the turntable 56b of the workpiece mount 56, if the workpiece W is conveyed toward the measurement position B by the workpiece mount 56, it interferes with the arm portion 116 at both ends of the inlet of the cutoff 114 of the interference prevention plate 112. As a result, the workpiece W is held between the arm portion 116 of the interference prevention plate 112 and the push pins 118 of the turntable 56b, so that the carriage 56a cannot proceed toward the measurement position B any further. Therefore further contraction of the rod 62 of the driving cylinder 60 compresses the coil spring 126 which is arranged between the dog 124 and the bracket 122, and the dog moves relatively to the bracket 122 and away from the position in opposed relationship to the proximity sensor 128

In this way, the proximity sensor 128 can detect that the workpiece W on the workpiece mount 56 has interfered with the interference prevention plate 112, i.e. that the workpiece W on the workpiece mount 56 is larger than the predetermined tolerable size. When the proximity sensor 128 detects that the workpiece W has interfered with the interference prevention plate 112, the control unit 30 stops the contraction of the rod 62 of the driving cylinder 60 thereby to stop the movement of the workpiece mount 56, in order to prevent an excessive force from being applied to the workpiece W and the interference prevention plate 112. The control unit 30 further extends the rod 62 to move the workpiece mount 56 away from the measuring gauge, unit 16 and the interference prevention plate 112.

In this way, the use of the interference prevention plate 112 and the interference detection mechanism shown in FIG. 8 can prevent the measuring gauge unit 16 of outer diameter measurement type from being broken by the workpiece W larger than the tolerable size.

As described above, in the case where the workpiece mount 56 is driven by the driving cylinder 60 through the coil spring 126, it is desirably light in weight. However, if a rotary motor is used in the workpiece mount 56 to rotate the turntable 56b, the workpiece mount 56 increases in weight. In order to solving this problem, a mechanism for rotating the turntable 56b of the workpiece mount 56 with a simple and lightweight structure is shown in FIG. 9.

Figure 9:
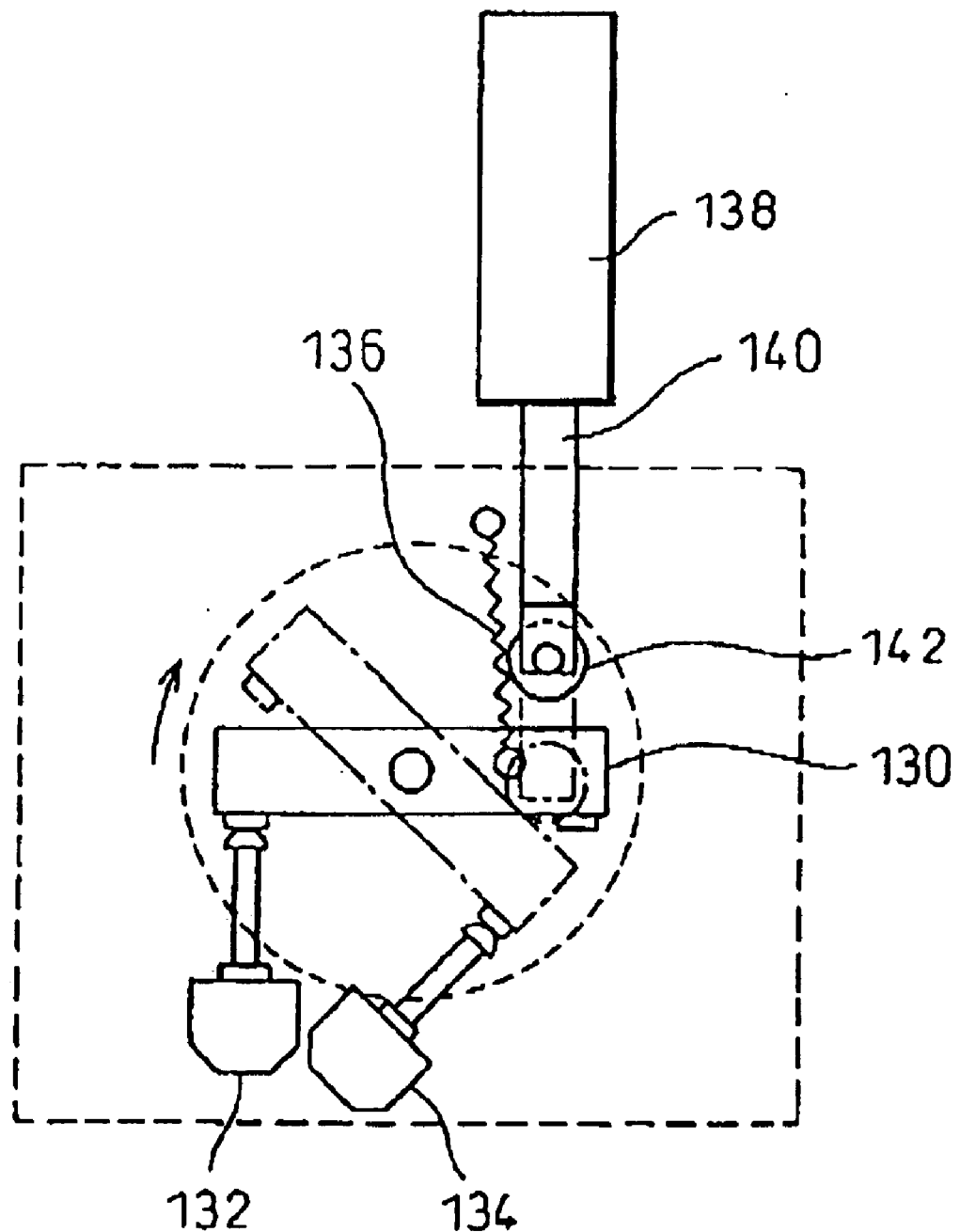
FIG. 9 is a diagram showing an embodiment of a mechanism for rotating a turntable of a workpiece mount with a simple and lightweight structure.

Referring to FIG. 9, a rectangular parallelopipedal transmission member 130 is mounted on the reverse side of the turntable 56b and adapted to rotate about the same rotational axis as that of the turntable 56b. The carriage 56a is provided with stoppers 132, 134 for stopping the transmission member 130 at two different positions, respectively, thereby allowing the transmission member 130 to rotate within a limited range. Specifically, when the transmission member 130 is rotated by a predetermined angle from a first rotational position (solid line) where the stopper 132 comes into contact with one end portion of the transmission member 130, the other stopper 134 comes into contact with the other end portion of the transmission member 130 so that the transmission member 130 stops at a second rotational position (one-dot chain). It should be noted that the stoppers 132, 134 can adjust the angle range within which the transmission member 130 can be rotated.

Further, in order to urge the transmission member 130 in one direction extending about the rotational axis thereof, an urging spring 136 is mounted on the transmission member 130. In the embodiment shown in FIG. 9, the urging spring 136 has one end thereof connected to the transmission member 130 and the other end thereof connected to the carriage, so that it usually applies a counterclockwise force to the transmission member 130 and urges it to the first rotational position.

On the other hand, a rotation cylinder 138 having a cam follower 142 mounted at the forward end portion of the rod 140 is disposed at the measurement position B. By extending the rod 140 of the rotation cylinder 138, and bringing the cam follower 142 at the forward end portion of the rod 140 into contact with one end portion of the transmission member 130 at the first rotational position, the transmission member 130 is rotated to the second rotational position clockwise against the urging force of the urging spring 136. Since the cam follower 142 is mounted at the forward end portion of the rod 140, the friction between the forward end portion of the rod 140 and the transmission member 130 is minimized and, therefore, the forward end portion of the rod 140 is not subjected to any lateral force to deform the rod 140.

In the workpiece mount 56 having this mechanism, the turntable 56b is usually urged by the urging spring 136 connected between the carriage 56a and the transmission member 130 mounted on the turntable 56b, thereby to stop at the first rotational position. However, when the workpiece mount 56 has moved to the measurement position B, the turntable 56b can be rotated to the second rotational position by activating the rotation cylinder 138 as required.

Further, in this embodiment, the turntable 56b can be stopped at a plurality of rotational positions, by using a multistage cylinder having a plurality of possible extended positions to be set, as the rotary cylinder 138.

In this way, the workpiece W placed on the workpiece mount 56 can be rotated. Therefore, even in the event that the design for the workpiece W is changed such that a recessed groove is formed in the outer peripheral surface of the workpiece W or in the inner peripheral surface of a hole thereof, the size of the outer peripheral surface portion of the workpiece W or the size of the inner peripheral surface portion of the hole of the workpiece W, as the case may be, not formed with the recessed groove can be measured. Referring to FIGS. 10A, 10B, 11A and 11B, a method of measuring the size of the workpiece W formed with recessed grooves will be explained below.

First, referring to FIGS. 10A and 10B, a measurement of an outer peripheral size of a workpiece W having recessed grooves 144 formed in the outer peripheral surface thereof will be described.

Figure 10A:
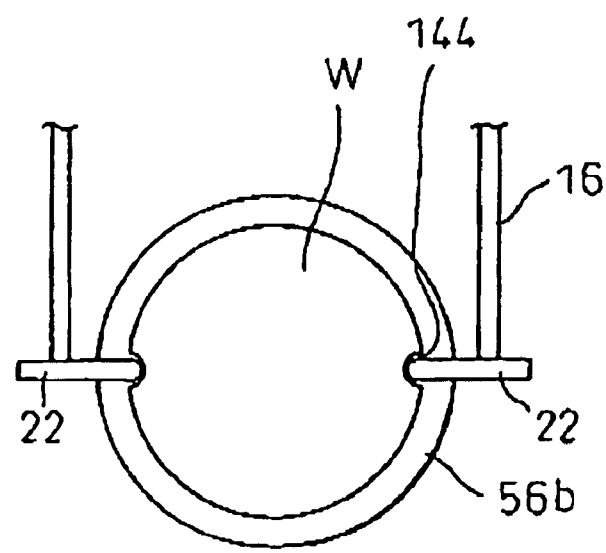
FIGS. 10A and 10B are schematic diagrams for explaining a measurement of an outer peripheral size of a workpiece having grooves formed in an outer peripheral surface thereof.

In the case where the recessed grooves 144 such as oil grooves are formed in the outer peripheral surface of the workpiece W, the gauge heads 22 of the measuring gauge unit 16 can be undesirably inserted into the channel-shaped grooves 144, as shown in FIG. 10A. Then, the size of the outer peripheral surface of that portion of the workpiece W which is formed with the recessed grooves 144 will be measured by the measuring gauge unit 16, which is inconvenient for the purpose of measuring that portion of the outer peripheral surface of the workpiece which is not formed with the recessed grooves 144.

Figure 10B:
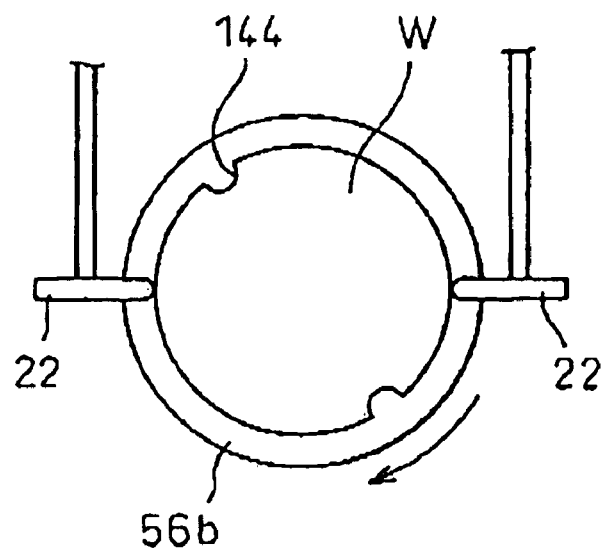

In view of this, in the workpiece measuring apparatus 10 according to the embodiment shown in FIGS. 10A and 10B, a tolerable range for measurement having the design value of the size of the outer peripheral surface of the workpiece W as a center value is preset in the control unit 30, so that when the control unit 30 determines that the size of the outer peripheral surface of the workpiece W measured by the measuring gauge unit 16 exceeds the preset tolerable range and that the measuring gauge unit 16 measures the size of that portion of the outer peripheral surface of the workpiece W which is formed with the recessed grooves 144, the workpiece W is rotated by the turntable 56b, after which the size of the outer peripheral surface of the workpiece W is measured again. In this operation, the angle by which the workpiece W is rotated is preferably smaller than the smallest one (180° in FIGS. 10A and 10B) of the angular intervals around the center line of the workpiece W between the adjacent recessed grooves 144, or more preferably not more than one half of the same smallest angular interval.

As the result of rotating the workpiece W by such an angle, the measuring gauge unit 16, as shown in FIG. 10B, can measure the size of that portion of the outer peripheral surface of the workpiece W which is not formed with the recessed grooves 144, with the gauge heads 22 arranged at the portion other than the recessed grooves 144.

Next, referring to FIGS. 11A and 11B, a measurement of an inner diameter of a hole of a workpiece W having recessed grooves 146 formed in the inner peripheral surface thereof will be explained.

Figure 11A:
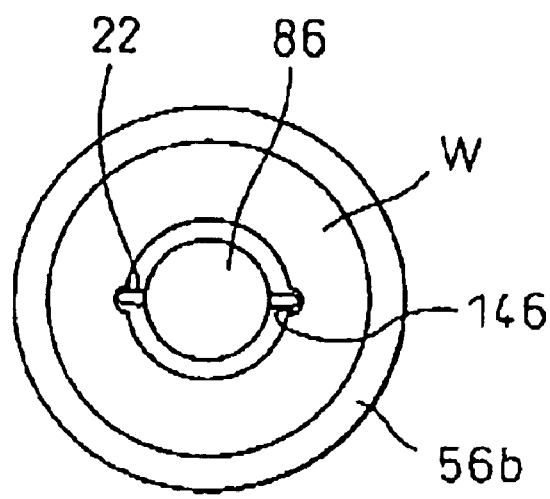
FIGS. 11A and 11B are schematic diagrams for explaining a measurement of an inner diameter of a hole formed in a workpiece having recessed grooves formed in an inner peripheral surface of the hole.

In the case where the recessed grooves 146 are formed in the inner peripheral surface of the workpiece W, the gauge heads 22 of the measuring gauge unit 86 of the inner diameter measurement type, as shown in FIG. 11A, can be also undesirably arranged within the recessed grooves 146, which is inconvenient for the purpose of measuring that portion of the inner peripheral surface of the hole which is not formed with the recessed grooves 146.

Figure 11B:
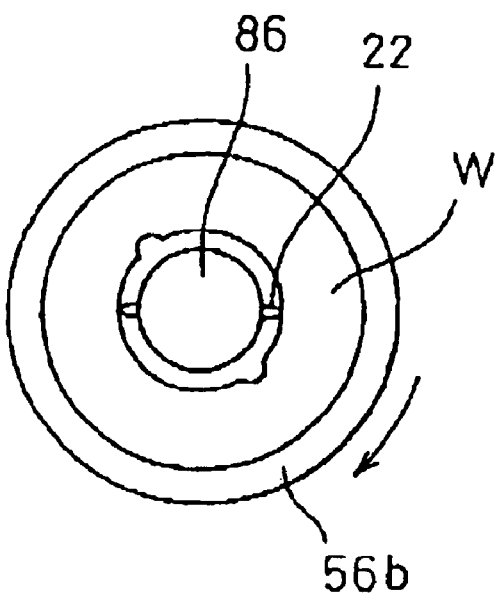

In view of this, in the workpiece measuring apparatus 10 according to the embodiment shown in FIGS. 11A and 11B, a tolerable range for measurement having the design value of the size of the inner peripheral surface of the hole of the workpiece W as a center value is preset in the control unit 30, so that when the control unit 30 determines that the size of the inner peripheral surface of the hole (i.e. the inner diameter of the hole) of the workpiece W measured by the measuring gauge unit 86 exceeds the preset tolerable range and that the measuring gauge unit 86 measures the size of that portion of the inner peripheral surface of the hole which is formed with the recessed grooves 146, the workpiece W is rotated by the turntable 56b, after which the size of the inner peripheral surface of the hole is measured again. In this operation, the angle by which the workpiece W is rotated, as in the case shown in FIGS. 10A and 10B, is preferably smaller than the smallest one (180° in the case of FIGS. 11A and 11B) of the angular intervals around the center line of the workpiece W between the adjacent recessed grooves, or more preferably not more than one half the same smallest angular interval.

As the result of rotating the workpiece W by such an angle, the measuring gauge unit 86, as shown in FIG. 11B, can measure the size of that portion of the inner peripheral surface of the hole which is not formed with the recessed grooves 146, with the gauge heads 22 arranged at the portion other than the recessed grooves 146.

In the embodiment shown in FIGS. 10A, 10B or 11A, 11B, when the rotation mechanism for the turntable 56b shown in FIG. 9 is used, a possible rotational angle range for the turntable 56b, which is defined by the stoppers 132, 134, can be set in the manner described above.

As an alternative, the turntable 56b may be rotated by use of a servo motor or a step motor. However, in this case, while the turntable 56b can be stopped at a plurality of rotational positions, the workpiece mount 56 is heavier. Therefore, it is preferably that the carriage 56a of the workpiece mount 56 is directly coupled to the rod 62 of the driving cylinder 60 without the intermediary of a spring. The direct coupling between the rod 62 and the carriage 56a excludes the use of the interference detection mechanism shown in FIG. 8. However, the provision of a similar mechanism to that shown in FIG. 8 on the interference prevention plate 112 makes it possible to detect the interference between the interference prevention plate 112 and the workpiece W. Specifically, the interference prevention plate 112 may be supported slidably along the length of the guide rails 54 of the conveying unit 20, while at the same time always urging the interference prevention plate 112 toward the transfer position by a spring or the like, thereby making it possible to detect the movement of the interference prevention plate 112 toward the measuring gauge unit 16 with a sensor.

In the case where the outer size or the outer diameter and the inner diameter are measured using two gauge heads, a pair of separate measuring units each having a single gauge head can be used. In this case, if the breakage prevention plate is separately fixed on each of the independent measuring units, the workpiece measuring apparatus can respond to the requirement for changing the measurement position or size of the workpiece simply by changing the position of the measuring unit.

What is claimed is:

1. A workpiece measuring apparatus for measuring at least one of a size and a shape of a workpiece, said apparatus comprising:

a machine base;

a column mounted on said machine base and having a mounting mechanism on at least one of the side surfaces thereof;

a measuring gauge unit removably mounted at an arbitrary position on said mounting mechanism of said column; and a conveying unit for conveying a machined workpiece to a measurement position where a measurement can be performed by said measuring gauge unit;

wherein a plurality of measuring gauge units can be removably mounted independently of each other at arbitrary positions on said mounting mechanism.

2. The workpiece measuring apparatus according to claim 1, wherein said mounting mechanism comprises one or more guide grooves, and said measuring gauge unit comprises or more sliding elements, said sliding element adapted to slidably engage in said guide groove.

3. The workpiece measuring apparatus according to claim 1, wherein said machine base includes a support portion and a base plate removably mounted on the top of said support portion, and wherein a plurality of different mounting sites for mounting said column thereon are formed on said, base plate, said column being removably fixed on said base plate.

4. The workpiece measuring apparatus according to claim 1, further comprising an operation panel for an operator to control the operation of said measuring gauge unit and said conveying unit, wherein said machine base includes a support portion and a base plate removably mounted on the top of said support portion, and wherein a plurality of different mounting sites for mounting said operation panel thereon are formed on said base plate, said operation panel being removably fixed at one of said mounting sites on said base plate.

5. A workpiece measuring apparatus for measuring at least one of a size and a shape of a workpiece, said apparatus comprising:

a machine base;

a column mounted on said machine base and having a mounting mechanism on at least one of the side surfaces thereof;

a measuring gauge unit removably mounted at an arbitrary position on said mounting mechanism of said column; and a conveying unit for conveying a machined workpiece to a measurement position where a measurement can be performed by said measuring gauge unit;

wherein an additional column is formed with a mounting mechanism, said additional column being mounted on said column.

6. The workpiece measuring apparatus according to claim 1, wherein when it is determined that at least one of a size of an outer peripheral surface of said workpiece and a size of an inner peripheral surface of a hole of said workpiece is out of a predetermined range, said workpiece is rotated and said measuring gauge unit thereafter measures at least one of the size of the outer peripheral surface of said workpiece and the size of the inner peripheral surface of the hole of said workpiece again.

7. The workpiece measuring apparatus according to claim 1, wherein said conveying unit includes a guide unit mounted on said base plate and a workpiece mount rotatable about a rotational axis extending vertically and movable along said guide unit, and wherein when a measured size of at least one of an outer peripheral surface of said workpiece and an inner peripheral surface of a hole of said workpiece is out of a predetermined range, said workpiece mount is rotated and the size of at least one of the outer peripheral surface of said workpiece and the inner peripheral surface of the hole of said workpiece is thereafter measured again.

8. The workpiece measuring apparatus according to claim 1, wherein said measuring gauge unit includes a movable portion for holding gauge heads, a driving portion for supporting said movable portion through an elastic element and driving said movable portion, and a sensor for detecting the displacement of said movable portion with respect to said driving portion, and wherein when said sensor detects the displacement of said movable portion with respect to said driving portion, the movement of said movable portion of said measuring gauge unit with respect to said workpiece is stopped or said workpiece and said measuring gauge unit are moved away from each other.

9. A workpiece measuring apparatus for measuring at least one of a size and a shape of a workpiece, said apparatus comprising:

a machine base;

a column mounted on said machine base and having a mounting mechanism on at least one of the side surfaces thereof;

a measuring gauge unit removably mounted at an arbitrary position on said mounting mechanism of said column; and a conveying unit for conveying a machined workpiece to a measurement position where a measurement can be performed by said measuring gauge unit;

wherein said machine base includes a support portion and a base plate removably mounted on the top of said support portion;

wherein a plurality of different mounting sites for mounting said column thereon are formed on said, base plate, said column being removably fixed on said base plate; and wherein said base plate is formed with an opening, and when an additional measuring gauge unit is disposed in said machine base, said additional measuring gauge unit can measure at least one of the shape and the size of the workpiece positioned above said base plate through said opening.

10. The workpiece measuring apparatus according to claim 9, further comprising an additional column formed with a mounting mechanism, said additional column being mounted on said column.

11. A workpiece measuring apparatus for measuring at least one of a size and a shape of a workpiece, said apparatus comprising:

a machine base;

a column mounted on said machine base and having a mounting mechanism on at least one of the side surfaces thereof;

a measuring gauge unit removably mounted at an arbitrary position on said mounting mechanism of said column; and a conveying unit for conveying a machined workpiece to a measurement position where a measurement can be performed by said measuring gauge unit;

wherein said measuring gauge unit includes an interference prevention plate, said interference prevention plate having a cutoff adapted to receive a workpiece smaller than a predetermined tolerable size when said workpiece moves to a measurement position, and wherein when a workpiece larger than said tolerable size moves to said measurement position, said workpiece interferes with ends of an inlet of said cutoff thereby to step the movement of said workpiece or to move said workpiece away from said measurement position.

12. The workpiece measuring apparatus according to claim 11, wherein said cutoff of said interference prevention plate is at a position between gauge heads in open state in preparation for the measurement.

* * * * *

UNITED STATES PATENT AND TRADEMARK OFFICE
CERTIFICATE OF CORRECTION

PATENT NO. : 6,742,273 B2
DATED : June 1, 2004
INVENTOR(S) : Nagatsuka et al.

It is certified that error appears in the above-identified patent and that said Letters Patent is hereby corrected as shown below:

Column 1,
Line 53, delete "versatile way.", insert -- versatile ways --.

Column 4,
Line 8, delete "arises", insert -- raises --.
Line 37, delete "head are", insert -- head is --.

Column 5,
Line 51, delete "workpiece w", insert -- workpiece W --.

Column 9,
Line 17, delete "referred as", insert -- referred to as --.

Column 10,
Line 15, delete "unit", insert -- units --.

Column 13,
Lines 6-7, delete "128 In this way,", insert -- 128. In this way, --.
Line 31, delete "solving", insert -- solve --.

Column 15,
Line 55, delete "preferably", insert -- preferable --.

Column 16,
Line 33, after "unit comprises", insert -- one --.
Line 41, delete "said, base", insert -- said base --.

UNITED STATES PATENT AND TRADEMARK OFFICE
CERTIFICATE OF CORRECTION

PATENT NO. : 6,742,273 B2
DATED : June 1, 2004
INVENTOR(S) : Nagatsuka et al.

It is certified that error appears in the above-identified patent and that said Letters Patent is hereby corrected as shown below:

<u>Column 18,</u>
Line 8, delete "said, base", insert -- said base --.
Line 42, delete "step", insert -- stop --.

Signed and Sealed this

Sixteenth Day of May, 2006

JON W. DUDAS
*Director of the United States Patent and Trademark Office*